Patented Sept. 21, 1926.

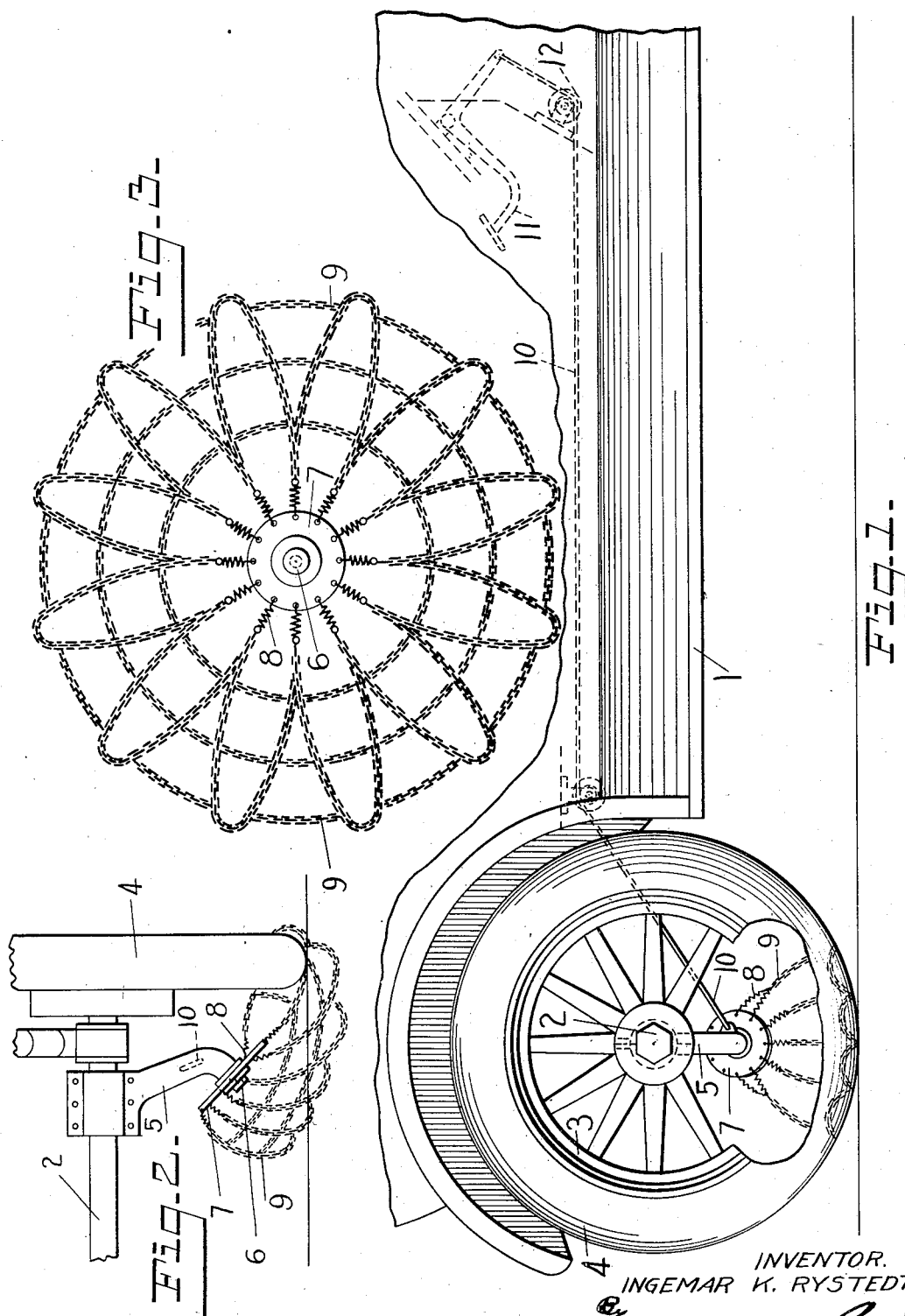

1,600,299

UNITED STATES PATENT OFFICE.

INGEMAR K. RYSTEDT, OF DAYTON, OHIO.

ANTISKID DEVICE FOR AUTOMOBILES.

Application filed April 10, 1925. Serial No. 22,186.

This invention relates to new and useful improvements in anti-skid devices for automobiles.

One object of the invention is to provide a device of the above type which may be easily and quickly placed in operation when the automobile meets conditions liable to cause it to skid.

A further object of the invention is to provide a device of the above type which need not be carried by the tires, thereby eliminating the tire damage caused by the usual skid chains.

Other objects of the invention will appear as the device is described in detail.

Referring to the accompanying drawings, Fig. 1 is a side elevation of a portion of an automobile equipped with my invention; Fig. 2 is a rear elevation of the same; and Fig. 3 is a plan view of the anti-skid device or attachment.

Referring more particularly to the accompanying drawings, 1 represents an automobile having a rear axle 2, wheel 3 and tire 4. Mounted on the automobile adjacent to one of the rear wheels is a mat of flexible material which is so arranged that it may be moved toward and from the ground and when in its lowermost position one side thereof will drag upon the ground so as to impart rotary movement to the mat as a whole, thus causing the forward portion of the mat to be thrown outwardly by centrifugal force into the path of the wheel. The further movement of the wheel will cause it to run onto the mat and further rotate the same so as to maintain a portion of the mat under the wheel until such time as the driver shall see fit to remove the same therefrom, as by backing the wheel off of the mat. The mat may take various forms but is preferably of flexible material and circumferentially continuous, that is, the outer portions of the mat are connected one to the other so that movement imparted to one outer portion of the mat will also be imparted to an adjacent portion of the mat. Any suitable means may be employed for supporting the mat in its proper position with relation to the wheel and in the present arrangement I have pivotally mounted on the rear axle 2 an arm 5 which carries on a pintle 6 a disk or revolving member 7. Attached to the periphery of the disk, through the aid of springs 8 in the present instance, is a plurality of chains or ropes which are interconnected to form a mat 9. The disk is so disposed relative to the wheel 3, that, when the arm 5 is in a lower position the chain mat 9 will extend under the tire 4 of the wheel 3, thereby providing a roughened surface over which the tire will travel. As the tire will force the mat 9 into firm contact with the road the mat will rotate on the pintle 6 and, as centrifugal force will cause the mat to spread, will provide a continuous anti-skid path for the wheel as long as the arm 5 is in a lower position. The arm 5, disk 7 and mat 9 are lowered and elevated by a cable 10 attached to the arm 5 and a foot lever 11 and which passes over guide pulleys 12. The lever 11 may be provided with a suitable holding ratchet of any well-known construction, which is not here shown. While I have shown in the drawing an anti-skid device for the rear right wheel, it is to be understood that the rear left wheel, and in fact, all wheels may be so equipped and operated from a single foot lever 11. The mat is mounted on the supporting arm for rotation about an axis inclined with relation to the arm and with relation to the ground and the mat is so arranged that when the arm is in its lowered position the mat will be inclined downwardly toward the wheel. When the arm is moved into its lowered position the lower portion of the mat, that is, that portion connected with the lower side of the disk 7, will rest upon the ground and will be dragged over the ground by the forward movement of the automobile. That part of the mat which is connected with the upper portion of the disk will either not engage the ground at all or will have much smaller contact therewith than the lower portion of the mat has. Consequently the drag of the mat over the ground will cause the same to rotate about its axis and the centrifugal force resulting from this rotation will throw the forward portion of the mat outwardly into the path of the wheel. When the wheel has run onto a portion of the mat the action of the wheel will tend to rotate the mat and draw successive portions of the same beneath the wheel, thus maintaining a portion of the mat beneath the wheel where it will serve to prevent the skidding of the wheel.

While I have shown and described one embodiment of my invention I wish it to be understood that I do not desire to be limited to the details thereof as various modifications may occur to a person skilled in the art.

Without limiting myself to the precise arrangement shown and described, which may be varied within the scope of the claims, I claim:—

1. In a device of the character described, a supporting structure having means for movably mounting the same on an automobile adjacent to one of the wheels thereof, a circumferentially continuous mat carried by said structure and so arranged that when said structure is moved into one position a portion of the mat will be caused to extend into the path of said wheel, and means for actuating said supporting structure.

2. In a device of the character described, a supporting structure having means for movably mounting the same on an automobile adjacent to one of the wheels thereof, a circumferentially continuous mat rotatably supported by said structure and so arranged that when said structure is moved into one position a portion of said mat will be caused to extend into the path of said wheel and will be acted upon by said wheel to rotate said mat and cause other portions thereof to be moved successively into the path of said wheel, and means for actuating said supporting structure.

3. In a device of the character described, a supporting structure having means for movably mounting the same on an automobile adjacent to one of the wheels thereof, a mat rotatably supported by said structure and so arranged that when said structure is moved into one position a portion of said mat will be caused to extend into the path of said wheel, said mat comprising a plurality of substantially radial flexible members and other flexible members connecting the outer portions of said radial members one to the other, and means for actuating said supporting structure.

4. In a device of the character described, a supporting structure having means for movably mounting the same on an automobile adjacent to one of the wheels thereof, a mat of flexible material having its outer portions connected one to the other, a member secured to said mat at substantially the center thereof, and rotatably mounted on said supporting structure, said member and said mat being so arranged that when said supporting structure is moved to its lower position a portion of said mat will be caused to extend into the path of said wheel, and means for actuating said supporting structure.

5. In a device of the character described, a supporting structure having means for movably mounting the same on an automobile adjacent to one of the wheels thereof, a mat of flexible material having its outer portions connected one to the other, said mat being mounted on said structure for rotation in an inclined plane, the lower portion of which is adjacent to said wheel, the radial width of said mat being such that the rotation thereof will cause a portion of the same to be moved into the path of said wheel, and means for actuating said supporting structure.

6. In a device of the character described, a mat, of flexible material having its outer portions connected one to the other, means for mounting said mat on an automobile adjacent to one of the wheels thereof for rotation about an inclined axis, and means for moving said mat toward and from the ground, said mat being of such a width that when moved to its lower position a portion thereof will be caused to extend into the path of said wheel.

7. In a device of the character described, a mat of flexible material having its outer portions connected one to the other, means for mounting said mat on an automobile adjacent to one of the wheels thereof for rotation about an inclined axis, and means for moving said mat toward and from the ground, said mat being of such a width that when moved to its position nearest the ground the lower portion thereof will drag on the ground, thereby rotating said mat and causing a portion thereof to be moved into the path of said wheel.

8. In a device of the character described, a supporting member having means for pivotally mounting the same on an automobile near one of the wheels thereof, a circumferentially continuous flexible mat carried by said member and so arranged that it will be supported in a position inclined downwardly toward said wheel when said supporting member is in a lowered position, and means for actuating said supporting member.

9. In a device of the character described, a supporting member having means for pivotally mounting the same on an automobile near one of the wheels thereof, a member rotatably mounted on said supporting member, a circumferentially continuous flexible mat carried by and rotatable with said rotatable member and so arranged that it will be supported in a position inclined downwardly toward said wheel when said supporting member is in a lowered position, and means for actuating said supporting member.

10. In a device of the character described, a supporting member having means for pivotally mounting the same on an automobile near one of the wheels thereof, a member rotatably mounted on said supporting member, a circumferentially continuous flexible mat extending about said rotatable member, yieldable connections between said mat and said rotatable member, said mat and said rotatable member being so arranged that said mat will be supported in a position inclined downwardly toward said wheel when said supporting member is in a lowered position, and means for actuating said supporting member.

11. In a device of the character described, a supporting arm having means for pivotally mounting the same on an automobile, a disk rotatably mounted on said arm on an inclined axis, a mat comprising flexible members connected one to the other near their outer ends, said mat extending about said disk, springs for connecting said mat with said disk, and means for actuating said supporting arms.

In testimony whereof, I affix my signature hereto.

INGEMAR K. RYSTEDT.